US009678266B2

(12) United States Patent
Li et al.

(10) Patent No.: US 9,678,266 B2
(45) Date of Patent: Jun. 13, 2017

(54) DISPLAY MODULE

(71) Applicant: Himax Display, Inc., Tainan (TW)

(72) Inventors: Yuet-Wing Li, Tainan (TW);
Kuan-Hsu Fan-Chiang, Tainan (TW)

(73) Assignee: Himax Display, Inc., Tainan (TW)

( * ) Notice: Subject to any disclaimer, the term of this patent is extended or adjusted under 35 U.S.C. 154(b) by 486 days.

(21) Appl. No.: 14/217,300

(22) Filed: Mar. 17, 2014

(65) Prior Publication Data

US 2015/0003035 A1    Jan. 1, 2015

Related U.S. Application Data

(60) Provisional application No. 61/839,877, filed on Jun. 27, 2013.

(51) Int. Cl.
*F21V 8/00* (2006.01)
*G03B 21/20* (2006.01)

(52) U.S. Cl.
CPC ......... *G02B 6/0035* (2013.01); *G02B 6/0015* (2013.01); *G03B 21/208* (2013.01); *G03B 21/2066* (2013.01); *G03B 21/2073* (2013.01)

(58) Field of Classification Search
CPC G02B 6/0015; G02B 6/0035; G03B 21/2066; G03B 21/2073; G03B 21/208
See application file for complete search history.

(56) References Cited

U.S. PATENT DOCUMENTS

| 6,447,122 B1 | 9/2002 | Kobayashi et al. |
| 7,128,459 B2 * | 10/2006 | Igarashi ............... G02B 6/0018 349/63 |
| 2002/0021498 A1 | 2/2002 | Ohtaka et al. |
| 2011/0002142 A1 * | 1/2011 | Yuuki .................. G02B 6/0036 362/606 |

(Continued)

FOREIGN PATENT DOCUMENTS

| CN | 1195118 | 10/1998 |
| EP | 0545705 | 6/1993 |

(Continued)

OTHER PUBLICATIONS

"Search Report of European Counterpart Application", issued on Dec. 2, 2014, p. 1-p. 8.

(Continued)

*Primary Examiner* — Thomas M Sember
(74) *Attorney, Agent, or Firm* — Jianq Chyun IP Office

(57) ABSTRACT

A display module is provided. A light source is configured to provide an illumination beam. A light guide plate has a first surface, a second surface opposite to the first surface, and an incident surface connecting the first surface and the second surface. The illumination beam enters the light guide plate through the incident surface. An optical structure is connected to the light guide plate and configured to change a propagation direction of the illumination beam. A reflective display unit is capable of modulating a polarization state of the illumination beam to form a modulated beam. The second surface is disposed between the reflective display (Continued)

unit and the first surface. The first surface is disposed between the second surface and a reflective polarizer, and the reflective polarizer filters the modulated beam into an image beam.

20 Claims, 3 Drawing Sheets

(56) References Cited

U.S. PATENT DOCUMENTS

2013/0308185 A1* 11/2013 Robinson .............. G02B 27/225
359/465

FOREIGN PATENT DOCUMENTS

| EP | 1043619 | 2/2007 |
|---|---|---|
| JP | 8281822 | 10/1996 |
| JP | H10326515 | 12/1998 |
| JP | 2001311904 | 11/2001 |
| JP | 2003007114 | 1/2003 |
| JP | 2003307728 | 10/2003 |
| JP | 2005521197 | 7/2005 |
| JP | 2013050694 | 3/2013 |
| KR | 100336602 | 5/2002 |
| WO | 9507435 | 3/1995 |
| WO | 2006036496 | 4/2006 |
| WO | 2007138501 | 12/2007 |
| WO | 2013018560 | 2/2013 |

OTHER PUBLICATIONS

"Office Action of Korea Counterpart Application" with English translation, issued on Jul. 22, 2015, p. 1-p. 12.
"Office Action of Japan Counterpart Application", issued on Jul. 7, 2015, p. 1-p. 4.
"Office Action of Korean Counterpart Application," issued on Nov. 11, 2016, p. 1-p. 16, with English translation thereof.
"OfficeAction of China Counterpart Application," issued on Mar. 14, 2017, p. 1-p. 15, in which the listed reference was cited.

* cited by examiner

DISPLAY MODULE

CROSS-REFERENCE TO RELATED APPLICATION

This application claims the priority benefits of U.S. provisional application Ser. No. 61/839,877, filed on Jun. 27, 2013. The entirety of the above-mentioned patent applications is hereby incorporated by reference herein and made a part of this specification.

BACKGROUND OF THE INVENTION

1. Field of the Invention

The invention relates to a display module and a light guide device.

2. Description of Related Art

In the display region of a display device, various types of spatial light modulators are applied to convert an illumination beam into an image beam, for example, transmissive liquid crystal display (LCD) panels, liquid-crystal-on-silicon (LCOS) panels, or digital micro-mirror devices (DMDs). The light efficiency of a transmissive LCD panel is less than that of a LCOS panel, and the cost of a DMD is greater than that of a LCOS panel.

Generally, in a projector using the LCOS panel, an s-polarized beam is reflected by a polarizing beam splitter (PBS) to the LCOS panel. Then, the LCOS panel modulates the s-polarized beam into a polarized beam with other polarization states, and reflects the polarized beam to the PBS. The PBS filters the polarized beam into an image beam, which is then transmitted to an image-forming lens. Finally, the image-forming lens projects the image beam onto a screen to form an image on the screen or forms a virtual image in the air or on any other virtual image plane.

In the projector using the LCOS panel, the beam splitting plane of the PBS is inclined with respect to the LCOS panel by about 45 degrees, so that the PBS occupies a large space between the LCOS panel and the image-forming lens. As a result, the distance between the image-forming lens and the LCOS panel is long, so that the projector is thick and bulky.

SUMMARY OF THE INVENTION

The invention is directed to a display module, which has a smaller thickness.

The invention is directed to a light guide device, which may uniformly distribute a light beam.

An embodiment of the invention provides a display module including a light source, a light guide plate, an optical structure, a reflective display unit, and a reflective polarizer. The light source is configured to provide an illumination beam. The light guide plate has a first surface, a second surface opposite to the first surface, and an incident surface connecting the first surface and the second surface. The illumination beam enters the light guide plate through the incident surface. The optical structure is connected to the light guide plate and configured to change a propagation direction of the illumination beam. The reflective display unit is capable of modulating a polarization state of the illumination beam to form a modulated beam. The second surface is disposed between the reflective display unit and the first surface. The first surface is disposed between the second surface and the reflective polarizer, and the reflective polarizer filters the modulated beam into an image beam.

An embodiment of the invention provides a light guide device including a light guide plate and an optical structure. The light guide plate has a first surface, a second surface opposite to the first surface, and an incident surface connecting the first surface and the second surface. A light beam enters the light guide plate through the incident surface. The optical structure is inside the light guide plate, and the optical structure is configured to change a propagation direction of the light beam.

In view of the above, in the display module according to the embodiment of the invention, the light guide plate, the optical structure, and the reflective polarizer are configured to guide the illumination beam to the reflective display unit. Since the light guide plate has a smaller thickness, the display module has smaller thickness and volume. Moreover, in the light guide device according to the embodiment of the invention, since the optical structure is configured to change a propagation direction of the light beam, the light guide device may uniformly distribute a light beam.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
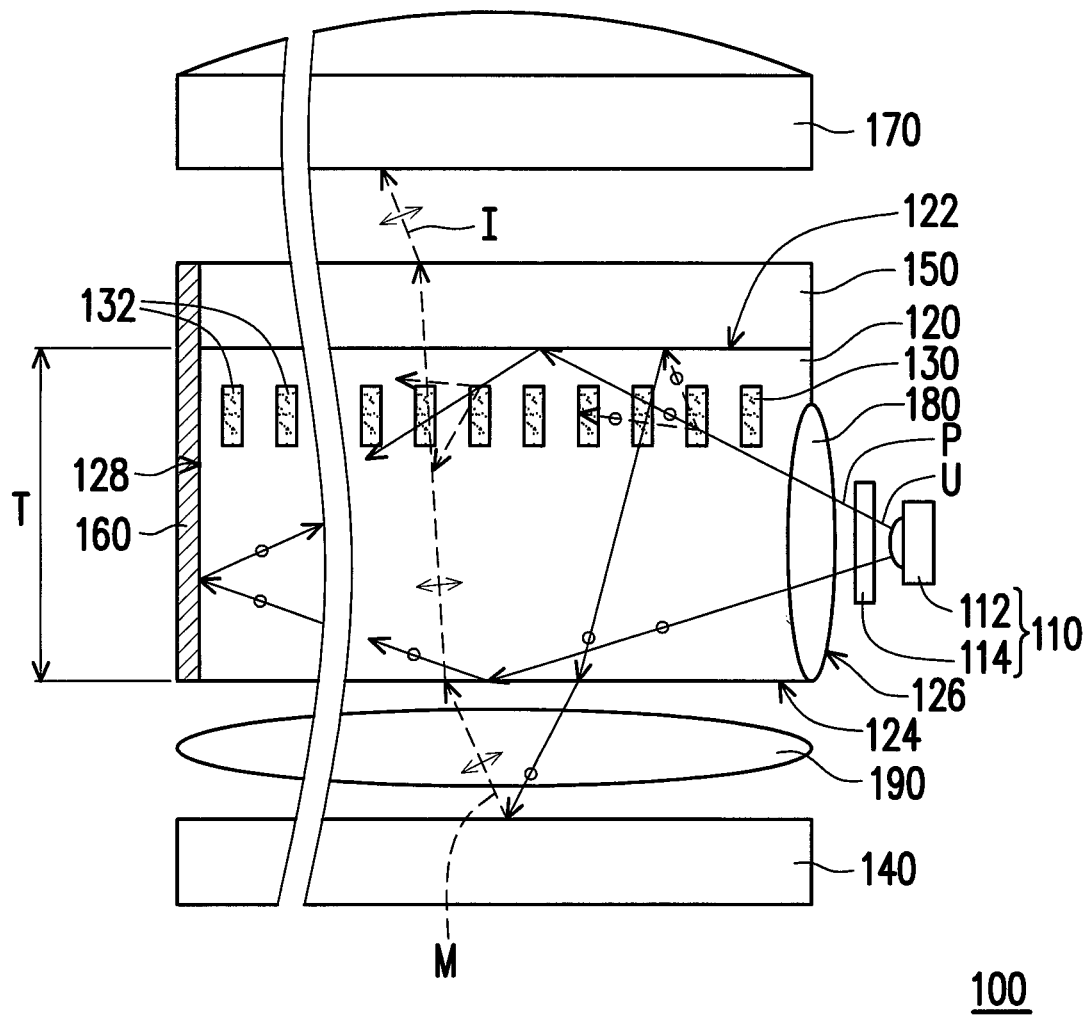
FIG. 1 is a schematic cross-sectional view of a display module according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic cross-sectional view of a display module according to an embodiment of the invention. Referring to FIG. 1, the display module 100 in this embodiment includes a light source 110, a light guide plate 120, an optical structure 130, a reflective display unit 140, and a reflective polarizer 150. The light source 110 is configured to provide an illumination beam P, i.e. a light beam. In this embodiment, the light source 110 includes at least one light-emitting device 112 (one light-emitting device is exemplarily shown in FIG. 1) and a polarizer 114. The light-emitting device 112 is configured to emit an unpolarized beam U. The polarizer 114 is disposed on the path of the unpolarized beam U and configured to filter the unpolarized beam U into a polarized beam, wherein the illumination beam P is the polarized beam. In detail, the polarizer 114 is a reflective polarizer which allows a portion of the unpolarized beam U having a first polarization direction to penetrate through and reflects another portion of the unpolarized beam U having a second polarization direction back to the light-emitting device 112. The polarizer 114 may be a dual brightness enhancement film (DBEF) or any other reflective polarizer. However, in other embodiments, the polarizer 114 may be an absorptive polarizer which allows the portion of the unpolarized beam U having the first polarization direction to penetrate through and absorbs the portion of the unpolarized beam U having the second polarization direction. In this embodiment, the first polarization direction is perpendicular to the second polarization direction. In other embodiments, the light source 110 may not include the polarizer 114 and the light source 110 provides an unpolarized beam; that is, the illumination beam P may be the unpolarized beam. However, in other embodiments, the light source 110 may be a polarized light source, e.g. a laser light source, and the illumination beam P is a polarized beam, and the light source 110 does not include the polarizer 114.

In this embodiment, the light-emitting device 112 is a light-emitting diode (LED), for example, a white LED. The white LED may have a blue LED chip configured to emit blue light and an encapsulant wrapping the blue LED. When the blue light excites the phosphor in the encapsulant, the phosphor may convert the blue light into a yellow light. The unconverted blue light and the yellow light combine to form a white light, i.e. the unpolarized beam U. However, in other embodiments, the light source 110 may include a plurality of light-emitting devices emitting lights of a plurality of colors, e.g. primary colors. For example, the light source 110 may include a red LED, a green LED, and a blue LED which are configured to emit a red light, a green light, and a blue light, respectively. A portion (e.g. the blue portion) of the unpolarized beam having the second polarization direction and reflected by the polarizer 114 may excite the phosphor (e.g. the yellow phosphor) in the encapsulant of the LED, so as to achieve light recycling and improve the light efficiency of the light source 110. In still other embodiments, the light source 110 may include laser emitters, e.g. laser diodes, which respectively emit laser lights with a plurality of colors to form the illumination beam P.

The light guide plate 120 has a first surface 122, a second surface 124 opposite to the first surface 122, and an incident surface 126 connecting the first surface 122 and the second surface 124. The illumination beam P enters the light guide plate 120 through the incident surface 126.

In this embodiment, the first surface 122 is an interface of a first medium (i.e. the material of the light guide plate 120) inside the light guide plate 120 and a second medium (e.g. air) outside the light guide plate 120, and the refractive index of the first medium is greater than that of the second medium. Moreover, in this embodiment, the second surface 124 is an interface of the first medium (i.e. the material of the light guide plate 120) inside the light guide plate 120 and a third medium (e.g. air) outside the light guide plate 120, and the refractive index of the first medium is greater than that of the third medium. As a result, the illumination beam P from the incident surface 126 may be totally internally reflected by the first surface 122 and the second surface 126 repeatedly, so that the illumination beam P may be transmitted to a third surface 128 which is opposite to the incident surface 126 and connects the first surface 122 and the second surface 124.

The optical structure 130 is connected to the light guide plate 120 and configured to change the propagation direction of the illumination beam P. In this embodiment, the optical structure 130 is a patterned scattering structure disposed inside the light guide plate 120. The optical structure 130 may include a plurality of sub-structures 132 arranged in the light guide plate 120. The refractive index of the optical structure 130 is different from that of the light guide plate 120, or the optical structure 130 may be made of any scattering material. As a result, when the illumination beam P from the incident surface 126 is incident on the optical structure 130, the optical structure 130 changes the propagation direction of the illumination beam P, e.g., scattering the illumination beam P. Since the propagation direction of the illumination beam P is changed, a part of the illumination beam P may be incident on the first surface 122 and the second surface 124 with an angle less than the critical angle. Consequently, the illumination beam P scattered by the optical structure 130 may penetrate through the first surface 122 and the second surface 124. In other words, the above-mentioned total internal reflection of the illumination beam P is disrupted by the optical structure 130. In one embodiment, when The refractive index of the optical structure 130 is different from that of the light guide plate 120, a part of the interface between the optical structure 130 and the light guide plate 120 form a total internal reflection (TIR) surface. That is to say, when the illumination beam P from the incident surface 126 is incident on the TIR surface, the incident angle is greater than the critical angle, so that the illumination beam P is totally internally reflected by the TIR surface to the reflective display unit 140.

The first surface 122 is disposed between the second surface 124 and the reflective polarizer 150. In this embodiment, the reflective polarizer 150 reflects a light with the first polarization direction (e.g. an s-polarized light), and allows a light with the second polarization direction (e.g. a p-polarized light) to penetrate through. Since the illumination beam P from the incident surface 126 has the first polarization direction, the illumination beam P scattered by the optical structure 130 and penetrating through the first surface 122 is reflected by the reflective polarizer 150 back to the first surface 122 and then transmitted in the light guide plate 120.

The second surface 124 is disposed between the reflective display unit 140 and the first surface 122. The illumination beam P reflected by the reflective polarizer 150 may penetrate through the first surface 122 and the second surface 124 in sequence to reach the reflective display unit 140. In addition, part of the illumination beam P scattered by the optical structure 130 is transmitted to the second surface 124 and penetrates through the second surface 124 to reach the reflective display unit 140. Other part of the illumination beam P scattered by one sub-structures 132 of the optical structure 130 is transmitted to the first surface 122 (or the second surface 122) and then totally internally reflected by the first surface 122 (or the second surface 122), and is then scattered by another sub-structures 132 of the optical structure 130. Some of the illumination beam P scattered by the sub-structures 132 twice or more penetrates through the second surface 124 and reaches the reflective display unit 140, and other of the illumination beam P scattered by the sub-structures 132 twice or more is totally internally reflected by the first surface 122 or the second surface 124 and is then scattered by another sub-structures 132.

In this embodiment, although the reflective polarizer 150 is disposed on the first surface 122, there may be an air gap between the reflective polarizer 150 and the first surface 122. As a result, the first surface 122 may be the interface between air and the material of the light guide plate 120.

In this embodiment, the display module 100 further includes a reflector 160 disposed on the third surface 128. The reflector 160 reflects a part of the illumination beam P not penetrating the second surface 124, so that the part of the illumination beam P may be still transmitted in the light guide plate 120. As a result, the probability of the illumination beam P scattered by the optical structure 130, penetrating through the second surface 124, and reaching the reflective display unit 140 is increased. Therefore, the light efficiency and uniformity of the display module 100 is improved.

The reflective display unit 140 is capable of modulating the polarization state of the illumination beam P to form a modulated beam M. The reflective display unit 140 may be a micro-display. In this embodiment, the reflective display unit 140 is a liquid-crystal-on-silicon (LCOS) panel configured to modulate and reflect the illumination beam P. For example, at least a part of the illumination beam P may be modulated from the s-polarized beam to a p-polarized beam, a beam with a circular or elliptic polarization state, or the illumination beam P is not modulated and kept to be an s-polarized beam. In other words, the modulated beam M may include an s-polarized beam, a p-polarized beam, a circularly polarized beam, an elliptically polarized beam, or any combination thereof. In other embodiments, the reflective unit 140 may be a micro-electromechanical system (MEMS) display, for example, a digital micro-mirror device (DMD).

The reflective polarizer 150 filters the modulated beam M into an image beam I. In this embodiment, the reflective polarizer 150 allows the part of the modulated beam M with the second polarization direction, e.g. the p-polarization, to penetrate through, and reflects the part of the modulated beam M with the first polarization direction, e.g. the s-polarization. Consequently, the part of the modulated beam M with the second polarization direction penetrating through the reflective polarizer 150 forms the image beam I.

In this embodiment, the display module 100 further includes an image-forming lens 170 disposed on the path of the image beam I from the reflective polarizer 150 to form a real image on a screen or a virtual image in the air or on any other virtual image plane. If the image-forming lens 170 forms the real image on the screen, the display module 100 is a real image projector. If the image-forming lens forms a virtual image in the air or on any other virtual image plane, the display module 100 is a virtual image display, e.g. a head-mounted display (HMD) or a head-up display (HUD). When all portions of the modulated beam M have the second polarization direction, the real image or the virtual image forms a white frame. When all portions of the modulated beam M have the first polarization direction, the real image or the virtual image forms a black frame. If the portions of the modulated beam have various polarization states, for example, a circular polarization state, an elliptic polarization state, a p-polarization state, and an s-polarization state, then various proportions of the modulated beam penetrates the reflective polarizer 150 at different positions thereof, so that an image frame is formed.

In the display module 100 according to this embodiment, the light guide plate 120, the optical structure 130, and the reflective polarizer 150 are configured to guide the illumination beam P to the reflective display unit 140. Compared with a polarizing beam splitter (PBS), the light guide plate has a smaller thickness, so that the display module has smaller thickness and volume. That is, the display module 100 may have an ultra-thin profile. As a result, the volume of the HMD, HUD or projector may be effectively reduced. In an embodiment, the thickness T of the light guide plate 120 may be smaller than 10 millimeters.

In this embodiment, the display module 100 further includes a light coupling optic 180 disposed on the incident surface 126 and configured to collect the illumination beam P from the light source 110. The light coupling optic 180 may be a lens, e.g. a convex lens, or a curved surface, e.g. a convex surface. In this embodiment, the light guide plate 120, the optical structure 130, the reflector 160, the light coupling optic 180, and the reflective polarizer 150 may form a light guide device.

In this embodiment, the display module 100 further includes a focusing lens 190 disposed on the path of the image beam I between the reflective display unit 140 and the second surface 124. The image-forming lens 170 and the focusing lens 190 focus on the reflective display unit 140; that is, the object plane is on the reflective display unit 140. As a result, human eyes may see the image formed by the reflective display unit 140 clearly without being affected by the optical structure 130. In order to maintain a high image quality, the gap between the sub-structures 132 may be larger than the width of the sub-structures 132; that is, the total area of the sub-structures 132 may occupy a small portion of the total area of the light guide plate 120. In another embodiment, the focusing lens 190 may be not used to further reduce the thickness of the display module 100, and the image-forming lens 170 focuses on the reflective display unit 140.

Figure 2:
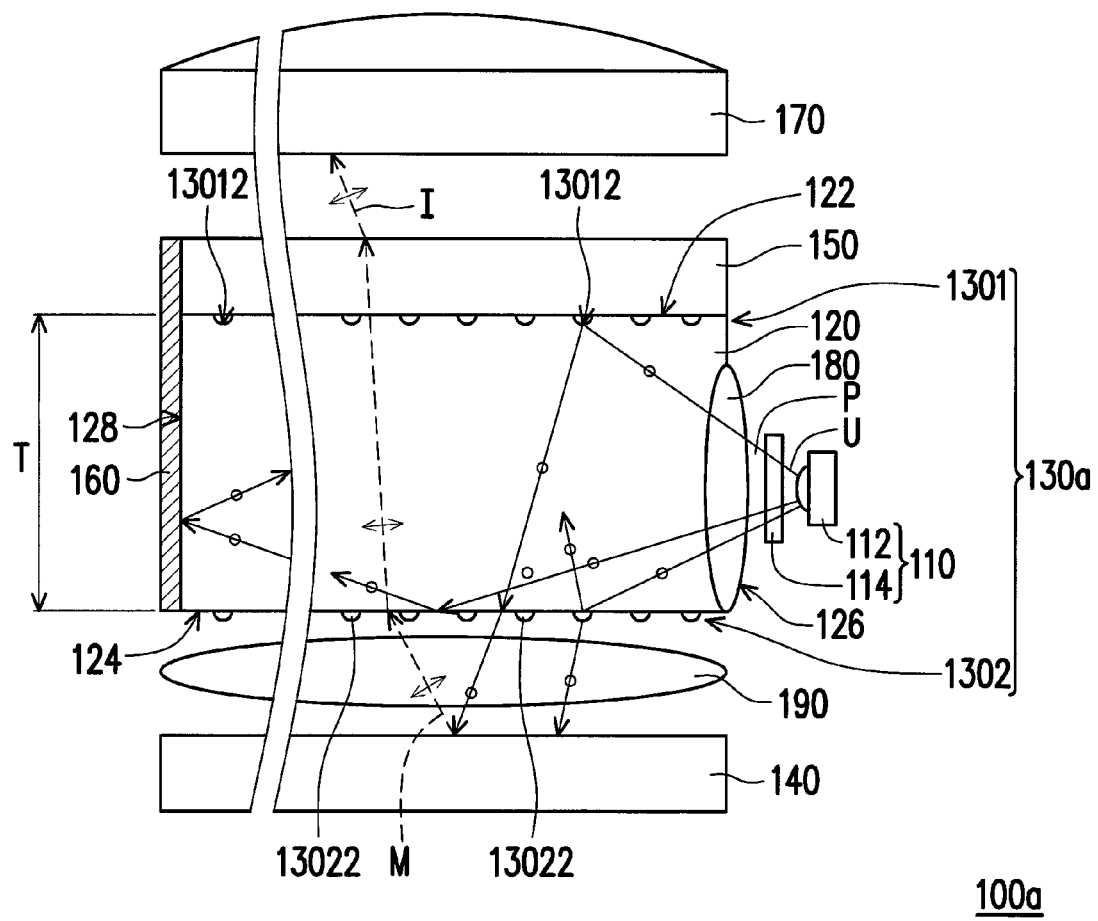
FIG. 2 is a schematic cross-sectional view of a display module according to another embodiment of the invention.

FIG. 2 is a schematic cross-sectional view of a display module according to another embodiment of the invention. Referring to FIG. 2, the display module 100a in this embodiment is similar to the display module 100 in FIG. 1, and the difference therebetween is as follows. In this embodiment, the optical structure 130a is a patterned scattering structure disposed on at least one of the first surface 122 and the second surface 124. FIG. 2 exemplarily shows the optical structure 130a being disposed on both the first surface 122 and the second surface 124. More specifically, the optical structure 130a includes a first patterned scattering structure 1301 disposed on the first surface 122 and a second patterned scattering structure 1302 disposed on the second surface 124. The first patterned scattering structure 1301 may include a plurality of micro-structures 13012 distributed on the first surface 122, and the second patterned scattering structure 1302 may include a plurality of micro-structures 13022 distributed on the second surface 124. The micro-structures 13012 and 13022 may scatter the illumination beam P to disrupt the total internal reflection of the illumination beam P, effecting the illumination beam P to be transmitted to the reflective display unit 140. In other embodiments, the display module 100a may have the first patterned scattering structure 1301 disposed on the first surface 122 but does not have the second patterned scattering structure 1302 disposed on the second surface 124. Alternatively, the display module 100a may have the second patterned scattering structure 1302 disposed on the second surface 124 but does not have the first patterned scattering structure 1301 disposed on the first surface 122. The micro-structures 13012 and 13022 may be protrusions (e.g. the micro-structures 13022 shown in FIG. 2), recesses (e.g. the micro-structures 13012 shown in FIG. 2), materials having a refractive index different from the light guide plate 120 and disposed on or embedded in the light guide plate 120, or scattering materials disposed on or embedded in the light guide plate 120. The top view of the optical structure 130 in FIG. 1 and the optical structure 130a in FIG. 2 may be dots-shaped, stripe-shaped, strips-shaped, straight-lines-shaped, curves-shaped, islands-shaped, etc.

Figure 3:
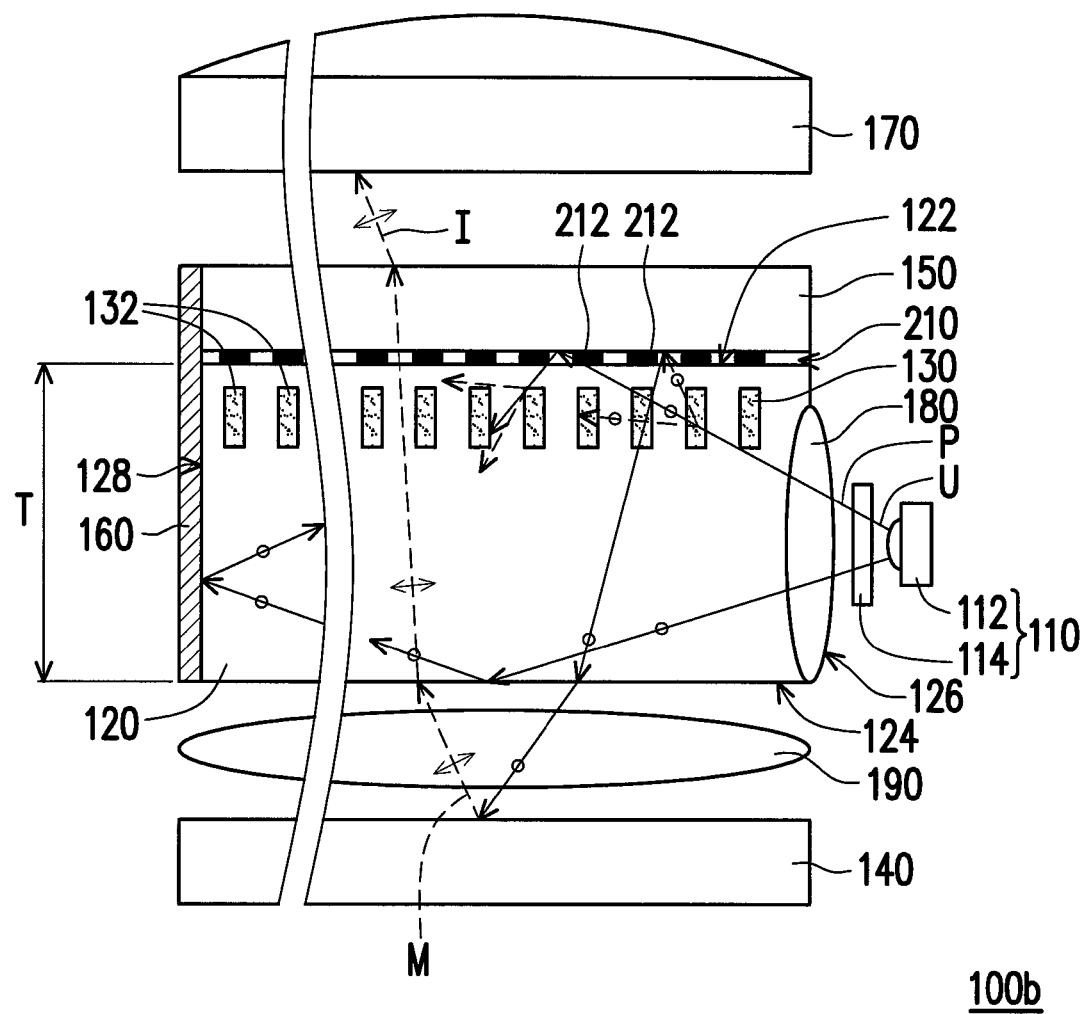
FIG. 3 is a schematic cross-sectional view of a display module according to another embodiment of the invention.

FIG. 3 is a schematic cross-sectional view of a display module according to another embodiment of the invention. Referring to FIG. 3, the display module 100b in this embodiment is similar to the display module 100 in FIG. 1, and the difference therebetween is as follows. The display module 100b in this embodiment further includes a patterned coating 210 formed on the first surface 122 and above the optical structure 130, and the patterned coating 210 is configured to reflect or absorb the stray light from the optical structure 130. In this embodiment, the patterned coating 210 is located between the light guide plate 120 and the reflective polarizer 150. Moreover, the shape and distribution location of the patterned coating 210 correspond to those of the optical structure 130. For example, the patterned coating 210 includes a plurality of patterns 212 respectively above the sub-structures 132, and the width of each pattern 212 may be slightly greater than that of each sub-structure 132. In this embodiment, the material of the patterned coating 210 may include a black resin, chromium, or aluminum, wherein the black resin and chromium may absorb the stray light, and the aluminum may reflect the stray light.

In conclusion, in the display module according to the embodiments of the invention, the light guide plate, the optical structure, and the reflective polarizer are configured to guide the illumination beam to the reflective display unit. Compared with a PBS, the light guide plate has a smaller thickness, so that the display module has smaller thickness and volume. That is, the display module may have an ultra-thin profile. As a result, the volume of the HMD, HUD or projector may be effectively reduced. Moreover, in the light guide device according to the embodiment of the invention, since the optical structure is configured to change a propagation direction of the light beam, the light guide device may uniformly distribute a light beam.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display module comprising:
a light source configured to provide an illumination beam;
a light guide plate having a first surface, a second surface opposite to the first surface, and an incident surface connecting the first surface and the second surface, the illumination beam entering the light guide plate through the incident surface;
an optical structure connected to the light guide plate and configured to change a propagation direction of the illumination beam;
a reflective display unit capable of modulating a polarization state of the illumination beam to form a modulated beam, the second surface being disposed between the reflective display unit and the first surface; and
a reflective polarizer, the first surface being disposed between the second surface and the reflective polarizer, the reflective polarizer filtering the modulated beam into an image beam.

2. The display module according to claim 1, wherein the optical structure is a patterned scattering structure disposed inside the light guide plate.

3. The display module according to claim 1, wherein the optical structure is a patterned scattering structure disposed on at least one of the first surface and the second surface.

4. The display module according to claim 1 further comprising an image-forming lens disposed on a path of the image beam from the reflective polarizer to form a real image or a virtual image.

5. The display module according to claim 1, wherein the reflective display unit is a micro-display.

6. The display module according to claim 1, wherein the light guide plate further has a third surface opposite to the incident surface, the third surface connects the first surface and the second surface, and the display module further comprises a reflector disposed on the third surface.

7. The display module according to claim 1 further comprising a light coupling optic disposed on the incident surface.

8. The display module according to claim 1, wherein the light source comprising:
at least one light-emitting device configured to emit an unpolarized beam; and
a polarizer disposed on a path of the unpolarized beam and configured to filter the unpolarized beam into a polarized beam, wherein the illumination beam is the polarized beam.

9. The display module according to claim 1 further comprising a focusing lens disposed on a path of the image beam between the reflective display unit and the second surface.

10. The display module according to claim 1, wherein the first surface is an interface of a first medium inside the light guide plate and a second medium outside the light guide plate, and a refractive index of the first medium is greater than that of the second medium.

11. The display module according to claim 1, wherein the second surface is an interface of a first medium inside the light guide plate and a third medium outside the light guide plate, and a refractive index of the first medium is greater than that of the third medium.

12. The display module according to claim 1, wherein a refractive index of the optical structure is different from that of the light guide plate.

13. The display module according to claim 1 further comprising a patterned coating formed on the first surface and above the optical structure and configured to reflect or absorb stray light from the optical structure, wherein a shape and a distribution location of the patterned coating correspond to a shape and a distribution location of the optical structure.

14. The display module according to claim 13, wherein a material of the patterned coating includes a black resin, chromium, or aluminum.

15. The display module according to claim 1, wherein the light source is a polarized light source, and the illumination beam is a polarized beam.

16. A light guide device comprising:
a light guide plate having a first surface, a second surface opposite to the first surface, and an incident surface connecting the first surface and the second surface, a light beam entering the light guide plate through the incident surface;
an optical structure inside the light guide plate, the optical structure being configured to change a propagation direction of the light beam, wherein the optical structure comprises a plurality of sub-structures, wherein a gap between two adjacent the sub-structures is larger than a width of the sub-structure; and
a reflective polarizer disposed on the first surface, wherein the reflective polarizer is located outside of the light guide plate.

17. The light guide device according to claim 16, wherein the optical structure is a patterned scattering structure.

18. The light guide device according to claim 16, wherein the light guide plate further has a third surface opposite to the incident surface, the third surface connects the first surface and the second surface, and the light guide device further comprises a reflector disposed on the third surface.

19. The light guide device according to claim 16 further comprising a light coupling optic disposed on the incident surface.

20. The light guide device according to claim 16, wherein a refractive index of the optical structure is different from that of the light guide plate.

\* \* \* \* \*